United States Patent
Steinich et al.

(10) Patent No.: US 7,619,405 B2
(45) Date of Patent: Nov. 17, 2009

(54) PROCESS FOR DETERMINING A TIME INTERVAL BETWEEN TWO IMPULSES BY CONVERTING A MEASURED ANALOG IMPULSE INTO A DIGITAL IMPULSE

(75) Inventors: Klaus Manfred Steinich, Zorneding/Pöring (DE); Peter Wirth, Eching (DE)

(73) Assignee: ASM Automation Sensorik Messetechnik GmbH, Moosinning (DE)

( * ) Notice: Subject to any disclaimer, the term of this patent is extended or adjusted under 35 U.S.C. 154(b) by 404 days.

(21) Appl. No.: 11/583,611

(22) Filed: Oct. 19, 2006

(65) Prior Publication Data
US 2007/0085726 A1    Apr. 19, 2007

(30) Foreign Application Priority Data
Oct. 19, 2005   (DE) ................. 10 2005 050 170
Sep. 6, 2006    (DE) ................. 10 2006 041 827

(51) Int. Cl.
*G01B 7/14* (2006.01)
(52) U.S. Cl. ................. 324/207.13; 324/207.24
(58) Field of Classification Search ............ 324/270.13, 324/207.24
See application file for complete search history.

(56) References Cited

U.S. PATENT DOCUMENTS 4,943,773 A   7/1990   Koski et al.
5,640,109 A   6/1997   Nyce
6,246,132 B1 * 6/2001  Joshi et al. ................. 310/26
6,489,899 B1 * 12/2002 Ely et al. ................... 341/20

FOREIGN PATENT DOCUMENTS

EP   0885373   6/1998
EP   1571425   11/2004

\* cited by examiner

*Primary Examiner*—Jay M Patidar
(74) *Attorney, Agent, or Firm*—Head, Johnson & Kachigian

(57) ABSTRACT

To improve the measurement precision and the robustness of the time measurement in spite of low installation size and cost, e.g. at a magnetostrictive position sensor, according to the invention a specific process for determining a time interval between a start impulse and a position impulse of a position sensor according to the travel time principle is proposed. The start impulse is generated by the position sensor and the position impulse is generated by a position magnet as response to the start impulse depending on the position of the position magnet. According to the invention the process comprises emitting of the start impulse, receiving an analog position impulse as a response to the start impulse in dependency of the position of the position magnet, generating from the analog position impulse at least one digital position impulse with defined time width such so that the middle of the position impulse of the digital position impulse is located at the middle of the position impulse of the analog position impulse and determining a time interval as the time difference between the starting impulse and the position impulse middle value of the digital position impulse.

43 Claims, 11 Drawing Sheets

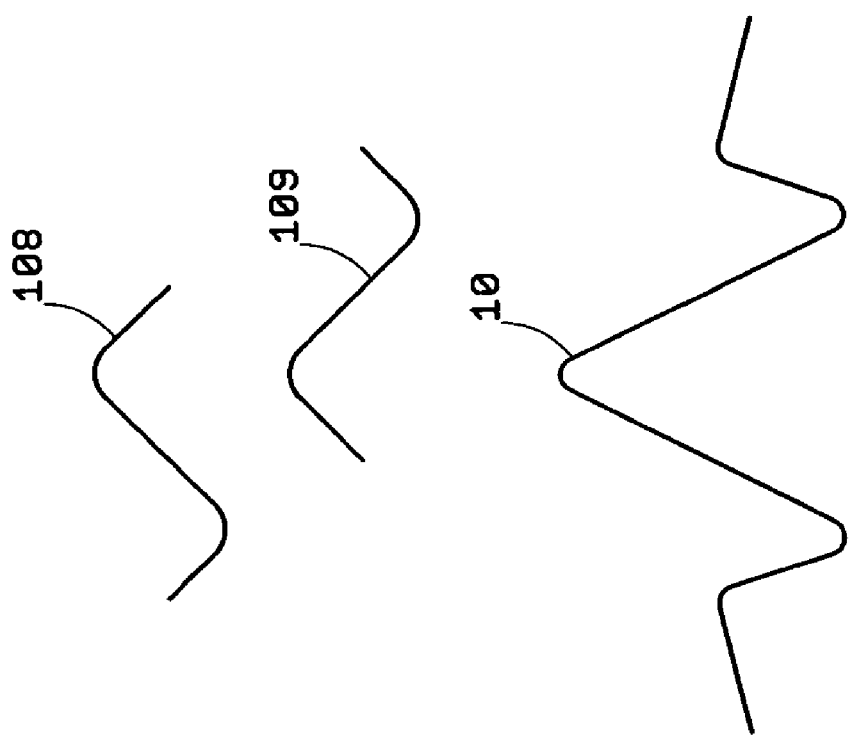

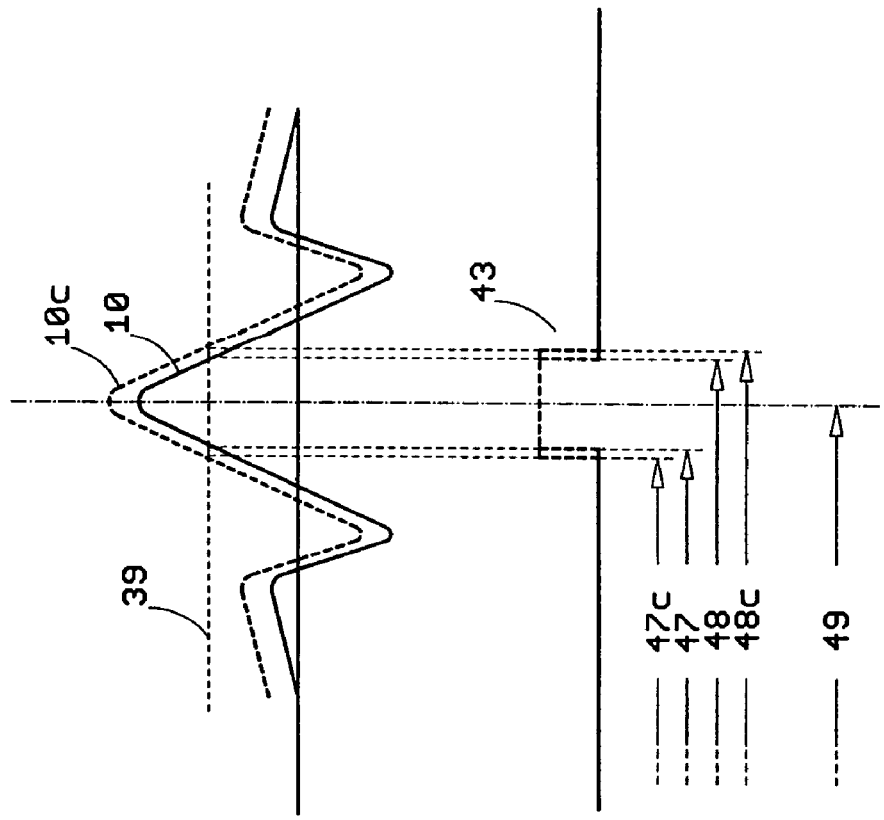
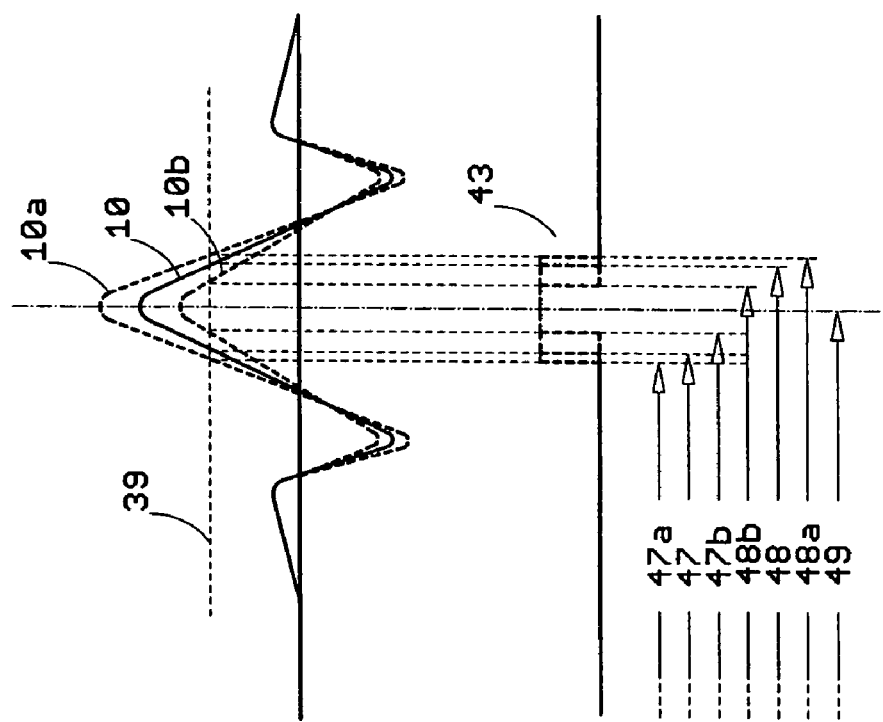

PROCESS FOR DETERMINING A TIME INTERVAL BETWEEN TWO IMPULSES BY CONVERTING A MEASURED ANALOG IMPULSE INTO A DIGITAL IMPULSE

CROSS-REFERENCE TO RELATED APPLICATIONS

This application claims priority to German Patent Application Nos. 10 2005 050 170.2 filed 19 Oct. 2005 and 10 2006 041 827.1 filed 6 Sep. 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention regards a process and a device for determining a time interval, in particular with position sensors, according to the travel time principle, e.g. in magnetostrictive position sensors.

2. Description of the Related Art

In position sensors according to the travel time principle, a time interval between a starting impulse and a stop impulse is determined whose duration represents the distance of the position indicator, mostly a position magnet, from the measurement location.

Therefore, it is obvious that the precision of the position sensor among other things depends on the precision of the determination of the time interval.

In addition, in other technical applications a precise determination of a very short time interval is often required.

The patent document EP0885373 provides an application specific special circuit SARA {12}, comprising a high resolution time measurement unit additionally provided with a state machine with a solid state program. The state machine is capable of independently processing the base measuring cycle of a magnetostrictive position sensor in a continuous manner. For further tasks of the measuring process and for interface communication an additional microcontroller {16} is provided, connected with the SARA circuit via a parallel 8-bit data bus, comprising 12 conductors. A disadvantage of this setup is the low flexibility of the solid state program state machine and the additional effort for communication and division of the processing tasks between the state machine and the microcontroller. Also, the high number of housing connector pins prevents miniaturization. In order to achieve the high measuring resolution, precision and stability, as a reference element for the time measurement, a quartz is suggested. From this results a cost and design disadvantage, since quartzes are expensive in comparison to other resonators and require substantially more space. In order to improve the sensitivity of the setup against interferences (noise), an adaptive noise window has been suggested. This is intended to avoid an erroneous triggering of the time measurement through interference impulses, since the time measurement is only released within a predetermined position impulse expectation window. A disadvantage of the noise window is the high computation effort for the adaptive positioning of the noise window.

The Patent document EP01571425 suggests a magnetostrictive position sensor allocating a band pass filter to the impulse detector in order to make the analog impulse signal less sensitive to interferences. In order to allow the integration of the hardware circuits into a standard housing, a set up comprising four independent and double sided printed circuit boards, connected amongst each other via printed circuit board connectors, has been suggested. The housing itself comprises more than eight application specific formed parts. A disadvantage of this set up is not only the effort for the many housing components, but also the reliability of the high number of pin connectors for the internal wiring. The requirement of a band pass filter is in contrast to the goal of achieving a simple circuit.

The Patent document U.S. Pat. No. 5,640,109 suggests for improvement of the interference resistance of the impulse detector against electrical and mechanical interference impulses a measurement of the peak value and a corresponding threshold adaptation. The adaptation of the switching threshold through a digital/analog converter requires a high resolution in order to keep step errors through the threshold adaptation below the resolution of the sensor. Furthermore, the measurement of the peak amplitude requires an additional effort in the respective circuits. Alternative embodiments of analog threshold adaptation to avoid step errors significantly increase the hardware effort for comparators, operational amplifiers, hold elements, analog switches and consume more space on the electronics unit.

The Patent document U.S. Pat. No. 4,943,773 suggests introducing a second comparator in order to improve the interference resistance and detection precision in order to recognize a first switching threshold, unequal zero, with a subsequent detection during zero passage. Also, an additional effort and placement surface on the electronics group are required for implementing the additional comparator.

BRIEF SUMMARY OF THE INVENTION

It is, therefore, an object of the present invention to improve the measuring precision and interference resistance of the time measurement, in particular, with magnetostrictive position sensors in spite of the reduced size of the electronics unit and reduced manufacturing cost.

Through the conversion into a digital signal and the determination of the time interval to the middle of the digital impulse, the measuring precision is increased and the interference resistance is improved.

For the same reason, not only one but several digital position impulses with different time width are generated from the analog impulse, and the time interval is determined through the digitally computed mean values of all digital impulses generated. Thereby, the digital position impulses can be created with respect to their width through subtracting a second from a first time interval, in particular, a second digital time interval from a first digital time interval.

Also, all other features serve to increase the precision and interference resistance of the time measurement, on the one hand, or the reduction of the space requirement for the electronics group and its cost, on the other hand.

BRIEF DESCRIPTION OF THE DRAWINGS

Embodiments according to the invention are subsequently described in an exemplary manner.

FIG. 1c shows a mechanic elastic impulse wave.

FIG. 7 illustrates a signal time diagram of an amplitude interference of the analog position impulse.

FIG. 8 shows a signal time diagram of an offset interference of the analog position impulse.

DETAILED DESCRIPTION OF THE INVENTION

Figure 1A:
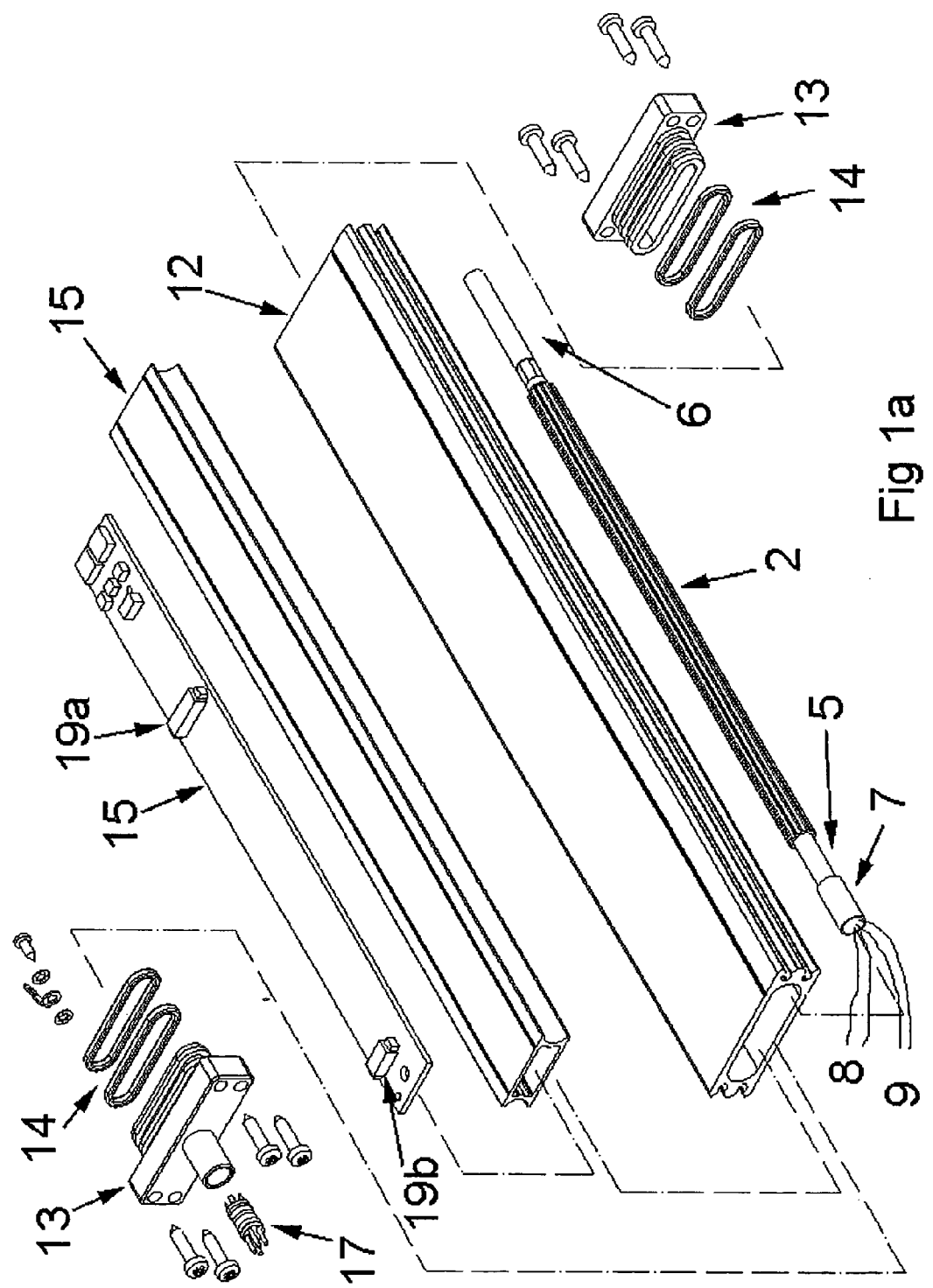
FIG. 1a shows the layout of a magnetostrictive position sensor according to the invention.
Figure 1B:
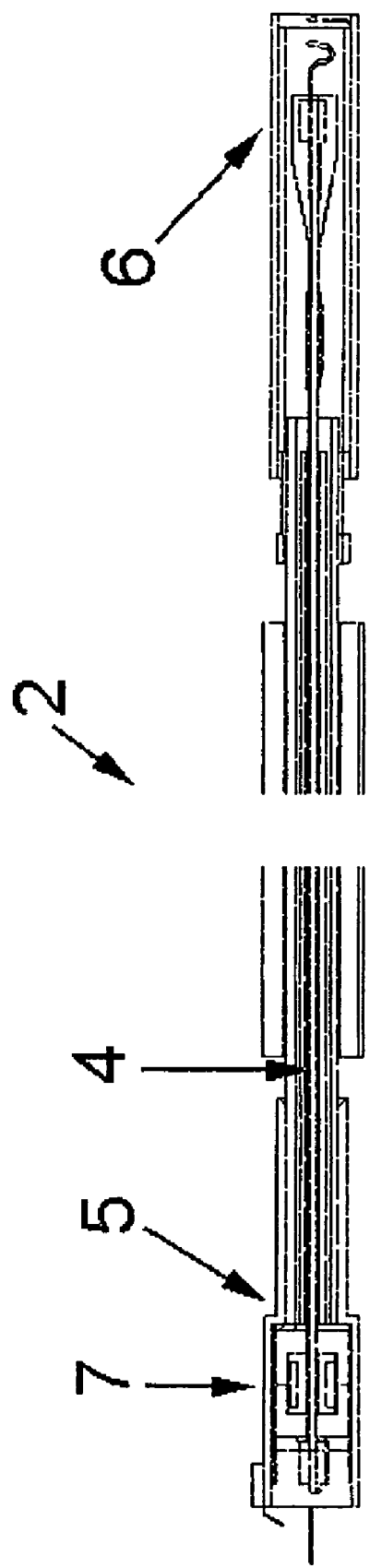
FIG. 1b illustrates the layout of the wave conductor detector unit of the present invention.
Figure 2:
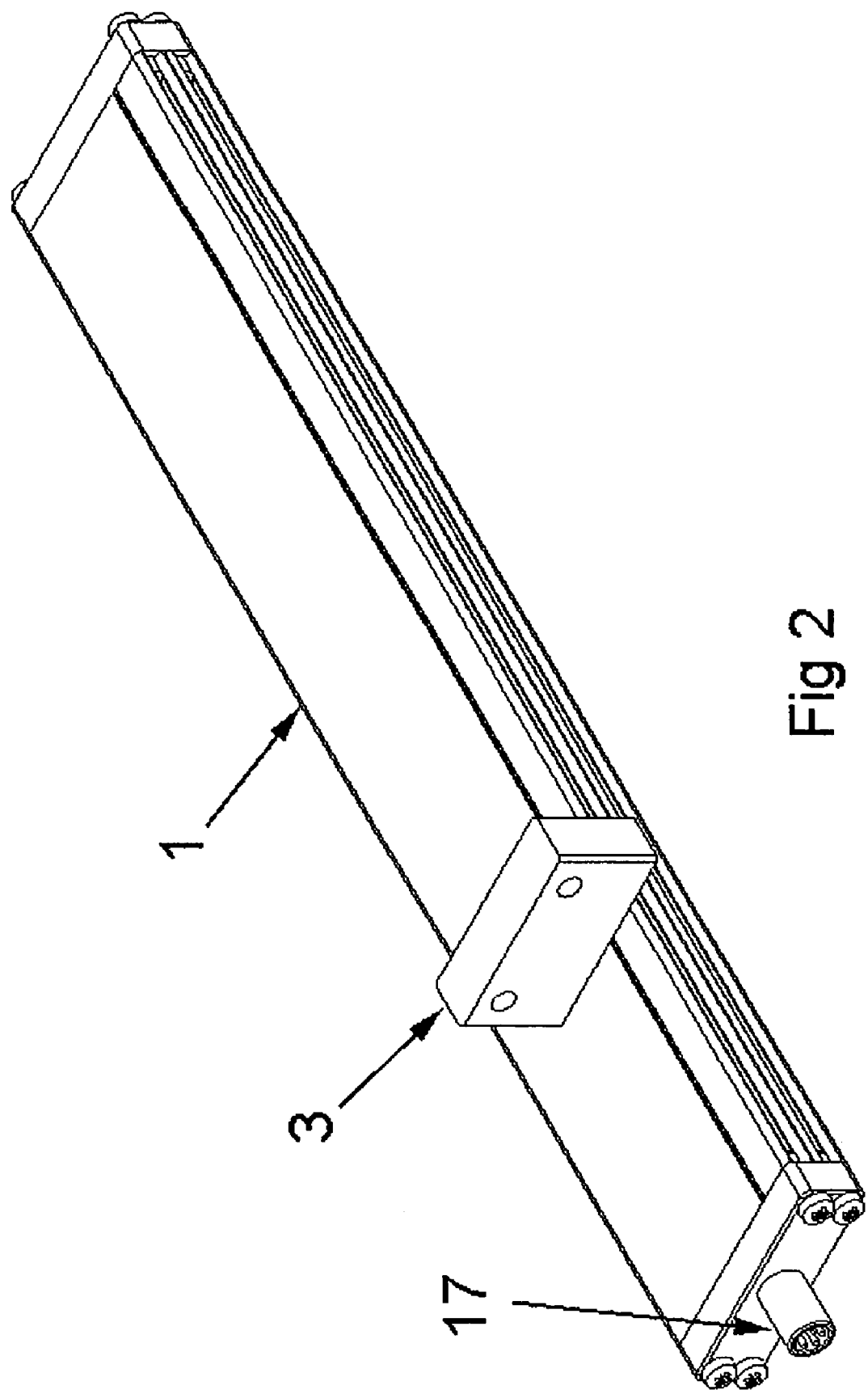
FIG. 2 shows a magnetostrictive position sensor according to the invention.

FIGS. 1a, 1b and FIG. 2 show the layout of a magnetostrictive position sensor according to the invention. The main feature of sensors of this kind is the measurement of the travel duration of a mechanic elastic impulse wave along the wave conductor. In a preferred embodiment, a position magnet (3) is guided along a wave conductor. The wave conductor is integrated into a wave conductor detector unit (2). Via a conductor pair (8) an electrical excitation impulse (11) is supplied to the wave conductor with an impulse duration of approximately two to five microseconds, generating a circular magnetic field along the wave conductor.

In the position where the magnetic field of the position magnet and the circular magnetic field of the wave conductor overlay, a mechanic elastic impulse wave is generated which propagates along the wave conductor. An impulse detector mounted at the end of the wave conductor detector unit converts the mechanic elastic impulse wave arriving after a travel duration into an analog electric voltage impulse (10). The travel duration of the mechanic elastic impulse wave until the arrival at the impulse detector is a measure for the position of magnet (3).

The excitation, induction and also the detection of the mechanic elastic impulse wave can also be performed with other means. An alternative embodiment provides the excitation of the mechanic elastic impulse wave through a piezoelement and provides the detection of a voltage impulse above the wave conductor. An additional alternative embodiment provides the excitation of the mechanic elastic impulse wave through a coil surrounding the wave conductor. Eventually, in an additional embodiment, the mechanic elastic impulse wave, instead of being excited in the wave conductor, can be inducted into it via a Villary-element. The principle of travel duration measurement of the mechanic elastic impulse wave is common to all sensors of this kind whose characteristic propagation results from two single impulses, superimposed in a time shifted manner (FIG. 1c 108, 109).

Figure 10:
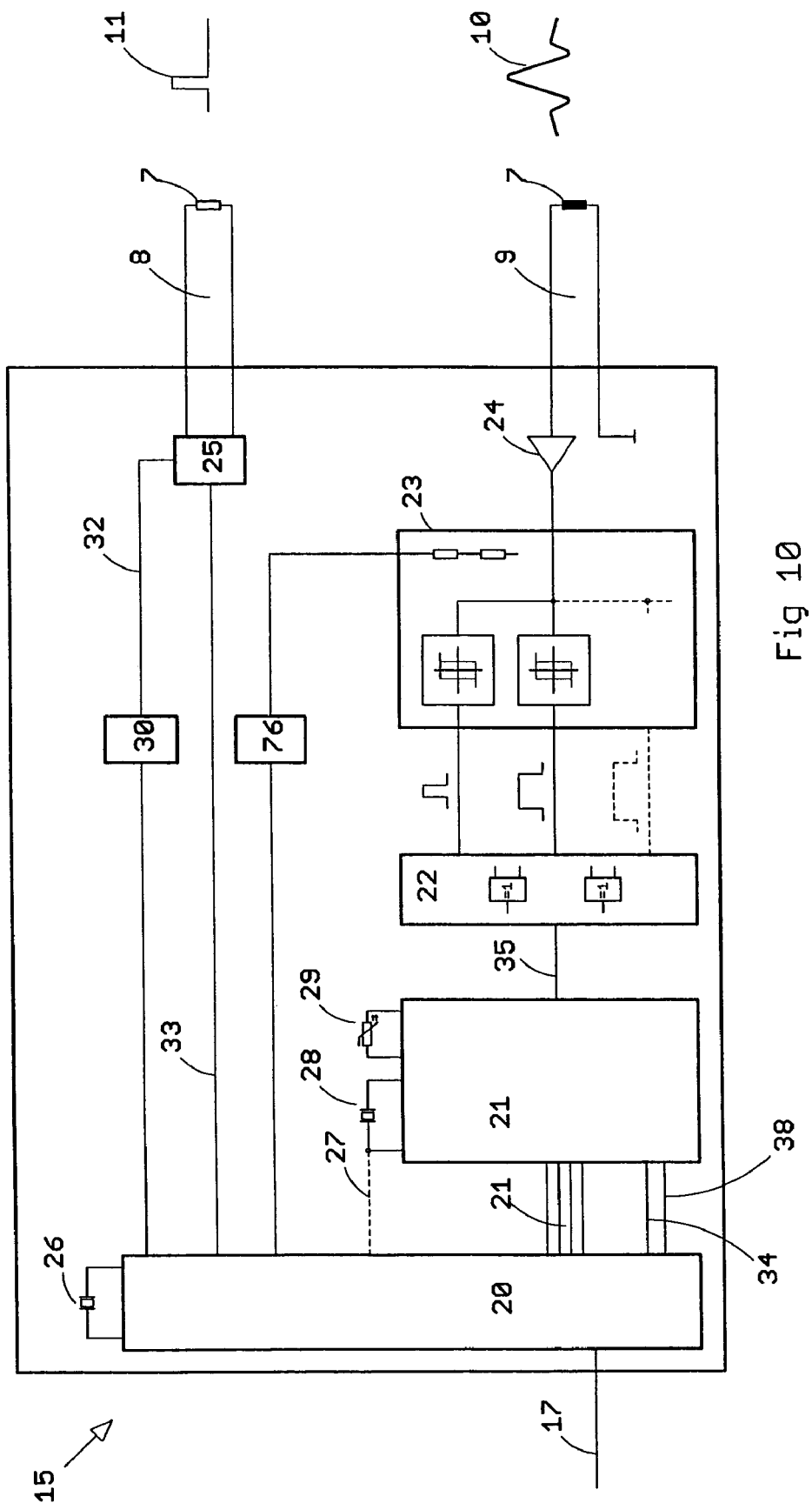
FIG. 10 illustrates a block diagram of the signal processing electronics of the magnetostrictive position sensor according to the invention.

FIG. 10 shows a block diagram of the signal processing electronics (15) of magnetostrictive position sensor (1) according to the present invention. A multitasking and arithmetic unit (20) is connected via connectors (19a, 17) with follow up electronics. The connection with the follow up electronics comprises the voltage supply (not shown) and interface signals for digital or analog transmission of position values (not shown). The multitasking and arithmetic unit is connected with a ceramic resonator (26) providing the processing timing. Via a switch (25) the multitasking and arithmetic unit generates an excitation impulse (11) in the conductor pair (8). A transformer unit (16) controlled by the multitasking and arithmetic unit generates the excitation voltage necessary for the excitation circuit (8). An analog position impulse (10) reaching a conductor pair (9) is amplified by a preamplifier (24) and supplied to a comparator unit (23). A digital analog converter (76) is connected to the comparator unit with its analog output. The digital analog converter (76) is controlled by the multitasking and arithmetic unit, or is integrated into it in an alternative embodiment. A digital comparator signal (35) of the comparator unit is connected with the input of a time measurement unit (21) through an association logic (22). In an alternative embodiment with only one comparator, the association logic is not necessary and the comparator signal is directly connected with the time measurement unit. The time measurement is started by the multitasking and arithmetic unit via the conductor (34) with an impulse (36). For data exchange, the multitasking and arithmetic unit is connected to the time measurement unit via a fast serial interface (21).

Figure 3:
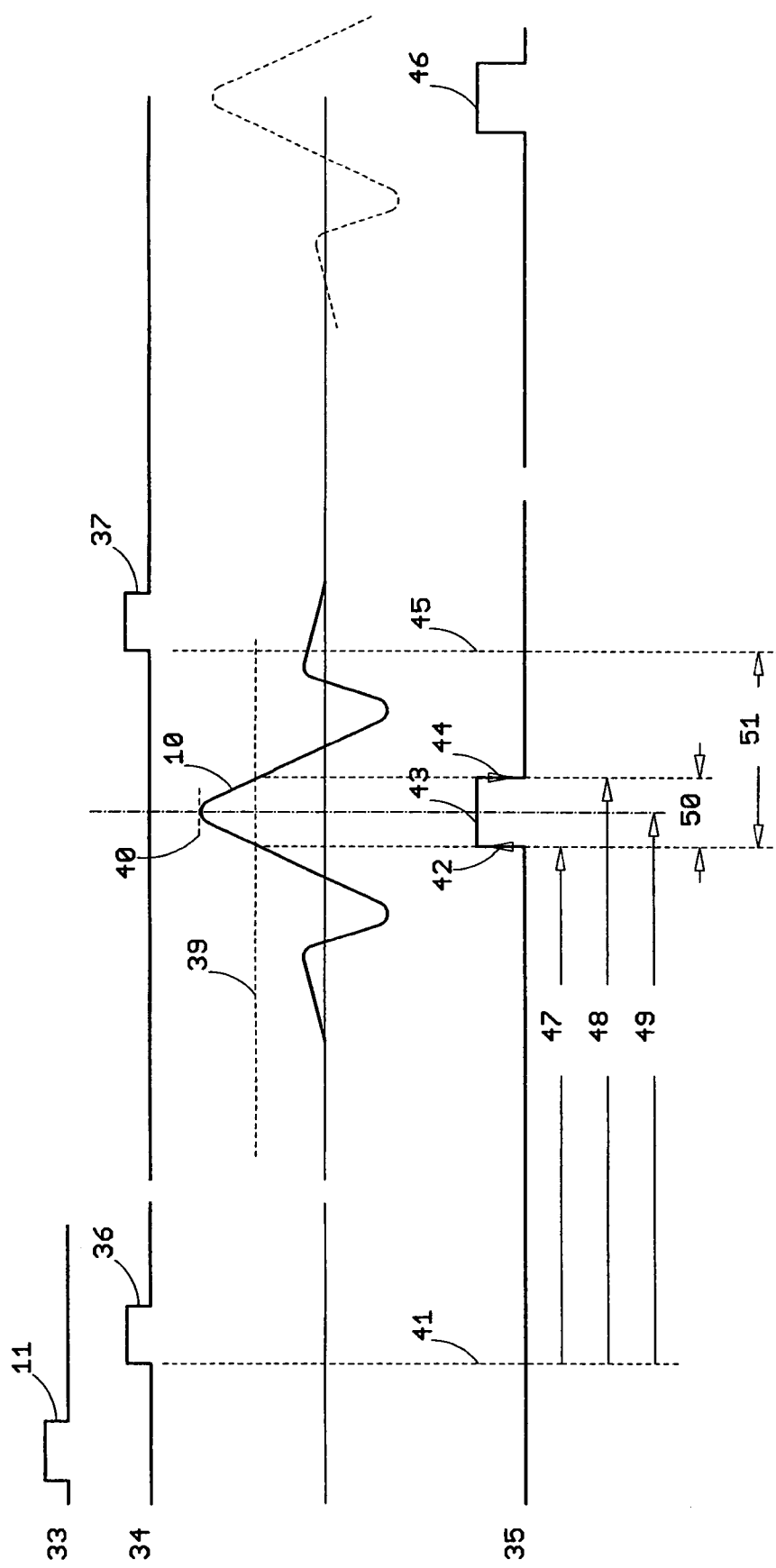
FIG. 3 illustrates a signal time diagram of a preferred embodiment with a comparator.
Figure 4:
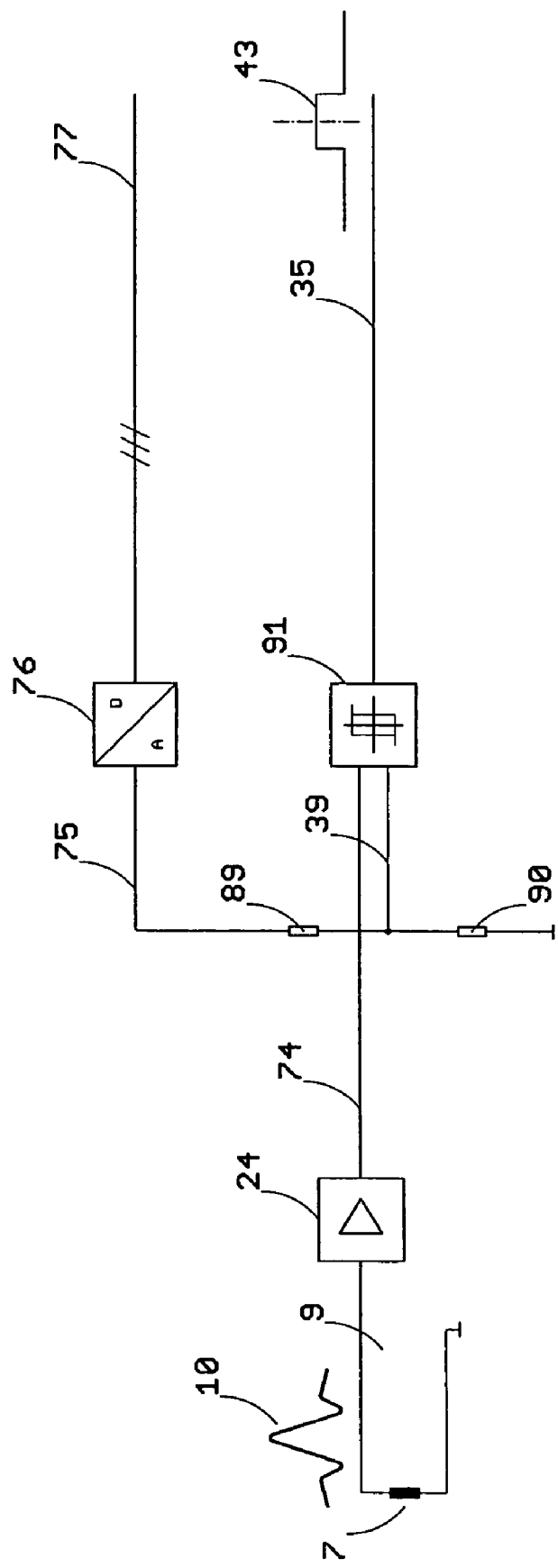
FIG. 4 shows a wiring schematic of a preferred embodiment with a comparator.

FIG. 4 shows a wiring diagram of the impulse value circuit according to the invention with a comparator (91). FIG. 3 shows the associated signal time diagram. From a preamplifier (24) via a conductor (74) the analog position impulse (10) is supplied to the comparator via a first input. A resistance divider comprising two resistors (89, 90) generates a reference voltage (39) supplied to a second input of the comparator via a conductor (111). The comparator generates a status signal (35). The comparator is provided as a comparator with a signal delay of 4-80 nanoseconds. Through voltage comparison at both inputs, the comparator converts the analog position impulse into a digital position impulse (43). As seen in FIG. 3, the digital position impulse has a leading flank (42) and a following flank (44), symmetric to a symmetry axis (31) of the analog position impulse.

An impulse width (50) of the digital position impulse depends on a switching threshold (39). If the switching threshold is raised to a higher voltage value, the impulse width is reduced. If the switching threshold is lowered, the impulse width is increased. Thereby, the symmetric position of the digital position impulse relative to the symmetry axis of the analog position impulse is maintained. On the other hand, the position of the digital impulse is not influenced through amplitude offset variations. In order to improve impulse detection, a position impulse mean value is created through averaging the measurement values of two intervals (47, 49). When the amplitude of the analog position signal (10) is increased (10a) or reduced (10b) through manufacturing tolerances or temperature, the position impulse mean value hereby remains unchanged. The interference is suppressed. The same applies for offset errors (10c), superimposing a DC voltage to analog position signal (10) and for low frequency interference voltages whose frequencies are tenfold below the base frequency of approximately 100 kHz of the position impulse. FIG. 7 shows the influence on the position signal through amplitude interference. FIG. 8 shows the influence through offset interference. The width increase (47a, 47c, 48a, 48c) of the digital position impulse (43) or its width decrease (47b, 48b) does not influence position impulse mean value (49).

Figure 5:
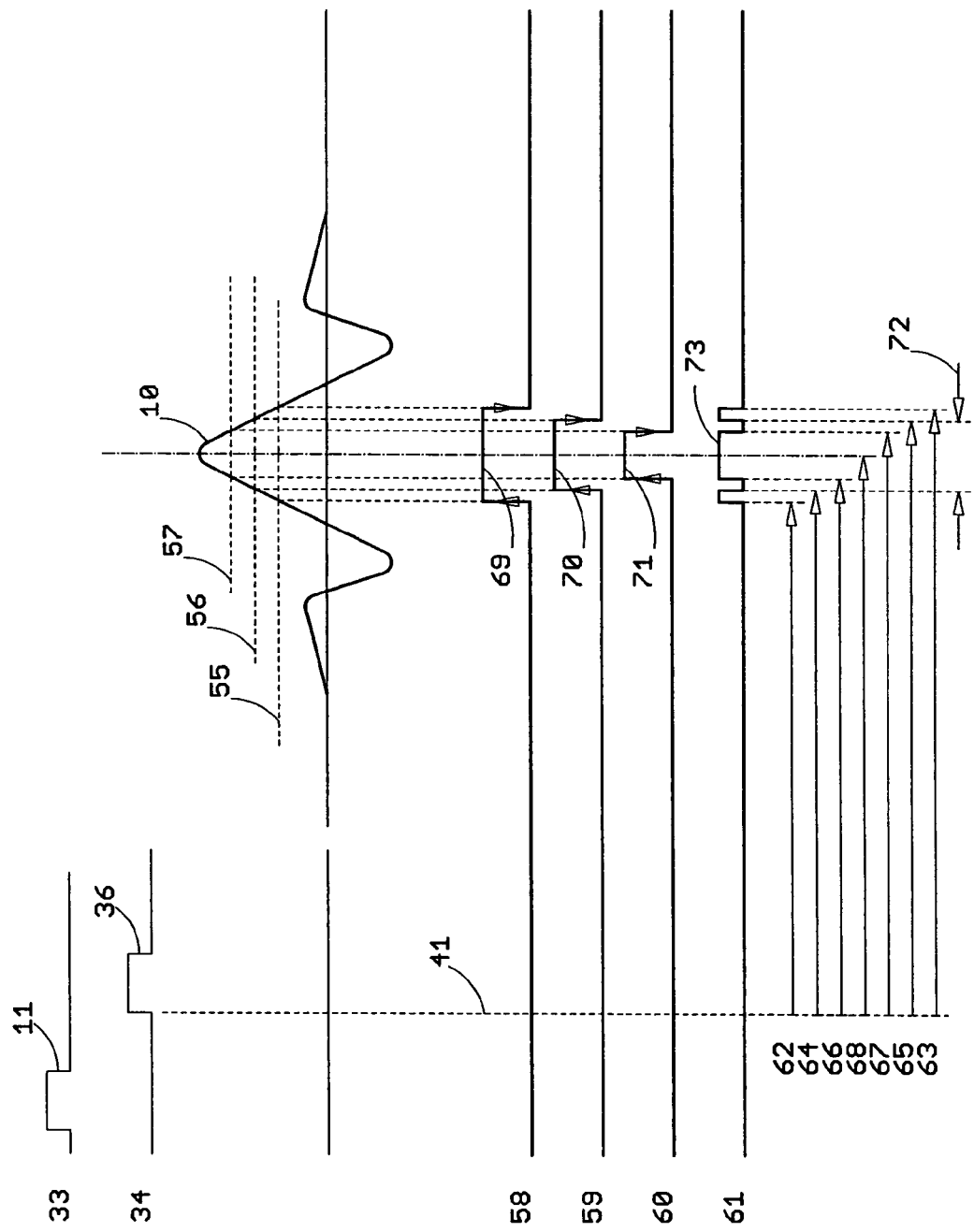
FIG. 5 illustrates a signal time diagram of an embodiment with three comparators.

The averaging of two measurement values for a position impulse reduces the statistic influence of high frequency interferences on the result of the measurement. As explained subsequently, this can be further improved in an alternative embodiment according to FIG. 5 by recording a larger number of measurement values for a position impulse. Since all measurement values are determined and processed within a measurement cycle, there is no influence on the dynamics of the measurement signal. With known sensors only through the repetition of complete measurement cycles an averaging could be accomplished this, however, reduces the dynamics of the measurement signal.

As seen in FIG. 3, the multitasking and arithmetic unit compares the impulse width (50) with predetermined reference values in consideration of the currently set switching threshold (39). If the difference is beyond a predetermined threshold an error flag is set. The error flag can be processed through an error processing task as subsequently described.

Figure 6:
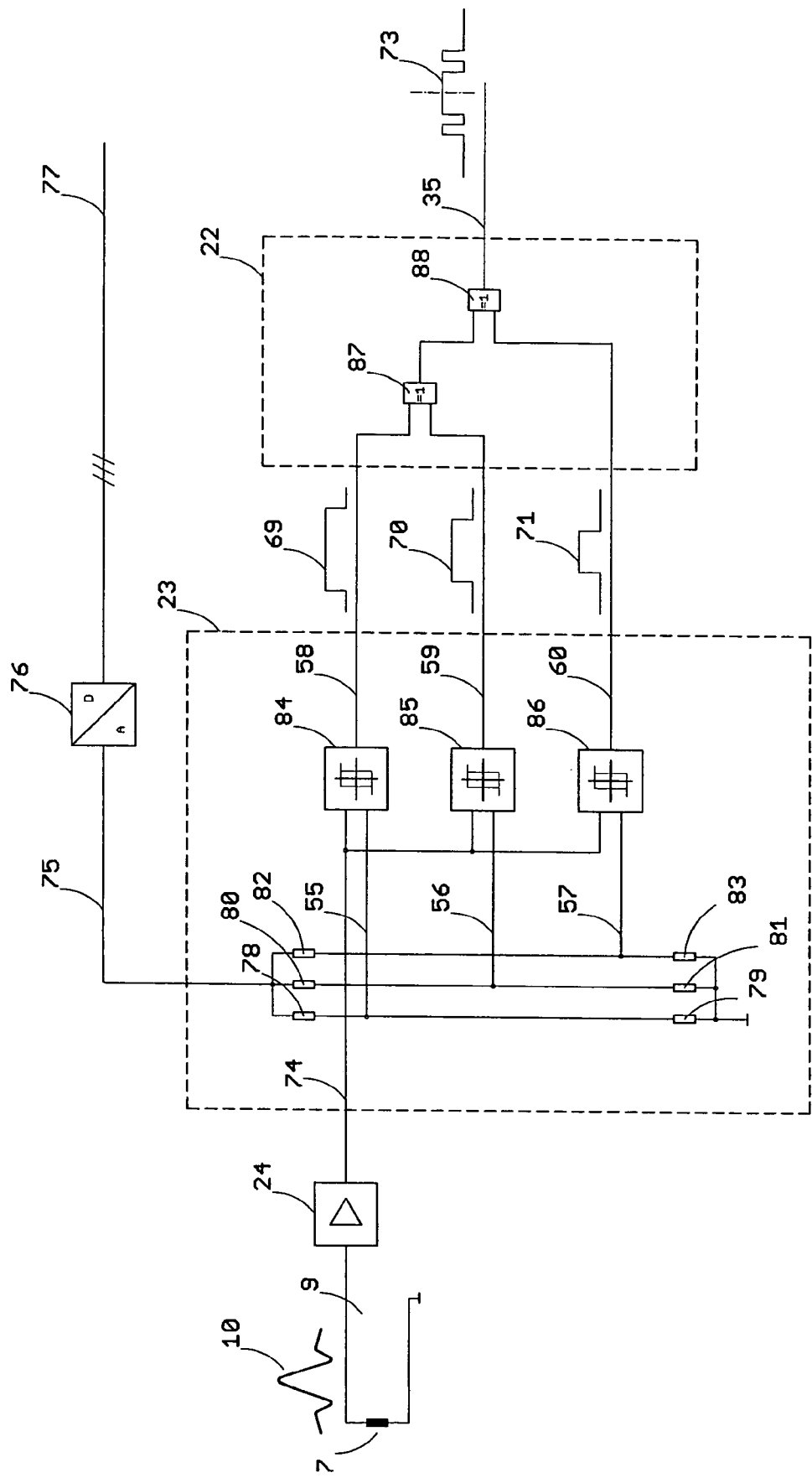
FIG. 6 shows a wiring diagram of an embodiment with three comparators.

Though the position impulse middle detection already eliminates influences on amplitude height and offset, the switching threshold of the comparator is adapted to the actual amplitude height in order to always maintain optimum interference spacing against superimposed interference signals. For a preferred embodiment, an optimum interference spacing of the comparator switching threshold at 70% of the amplitude peak value is accomplished. Instead of the amplitude peak value, the impulse width is used as a measurement variable for adapting the comparator switching threshold. As seen in FIG. 6, the multi-tasking and arithmetic unit adapts the switching threshold with a digital analog converter (76) after each measuring cycle so that a predefined impulse width is achieved. The switching threshold adaptation over the impulse width of the position signal makes the capturing of the impulse peak value and the associated circuit redundant. For a state of the art impulse detector, processing a single signal flank per position impulse, the resolution of the digital analog converter (76) for adapting the switching threshold must not be selected too small since the adaptation is performed in increments due to the quantification of the signal (75). During detection this leads to a time error, since the switching point on the inclined flank of the analog position signal is not only moved up and down but also along the time axis. This is also called walking effect. The circuit, according to the invention, due to the location of the measured values symmetrical to the middle line of the position impulse, avoids the walking effect also in case of coarse quantification of the signal (75). This allows the use of an economical 8-bit digital analog converter (76), in the preferred embodiment, which can be realized through a typical pulse width modulated output with resistor/capacitor set up.

In order to avoid the walking effect, impulse detectors according to the state of the art use the detection during zero voltage passage of the position signal whose time position it is ideally not influenced by amplitude variations. Since the switching threshold for the zero passage does not differ from the noise of the signal base line, an additional switching condition, different from zero voltage, has to be introduced and a switching release for zero passage detection has to be generated from it. According to the state of the art, therefore, an additional detector is required with a switching threshold different from zero voltage whose switching signal, however, does not contribute to position precision.

FIG. 6 shows the wiring diagram of an alternate embodiment of the impulse processing circuit with a first (84), second (85), and third (86) comparator. FIG. 3 shows the associated signal time diagram. Through the preamplifier (24) all three comparators are supplied with the first position impulse (10) via a first input via a conductor (74). A first (78, 79), a second (80, 81), and a third (82, 83) resistance divider generates reference voltages (55, 56, 57), which are supplied to the second input of the three comparators. At the outputs of the comparators, the digital comparator signals (58, 59, 60) are supplied. Through voltage comparison at both inputs, the comparators convert the analog position impulse into digital impulses (69, 70, 71). Since the switching thresholds are different for each comparator, the switching points for the digital position digital impulses have different timing and digital position impulses (69, 70, 71) with different impulse widths are created. Each of the three position impulses is located symmetrical to the symmetry axis of the analog position impulse. The digital comparator signals are supplied to an association logic (22).

The association logic merges all comparator signals (58, 59, 60) in a combinatory manner into a single comparator signal (35). Preferably, the association is performed through one or several EXCLUSIVE-OR grids (EX-OR-Grids). An EX-OR grid has two inputs X1, X2 and one output Y. The output assumes the status HIGH, when the inputs have different status—it assumes the status low when the inputs have the same status. In Bool notation: Y=X1+X2. Two comparator signals are supplied to the two inputs X1, X2 of one of the EX-OR grids. The Y outputs of the EX-OR-grids or the remaining comparator signals are supplied in pairs to a next grid until all association paths are combined into the comparator signal (35). For the alternative embodiment with three comparators, two EX-OR grids are being used. The comparator signal (35) supplied by the association logic changes its status with each status change of one of the supplied comparator signals. Since the time measuring unit processes each status change independent of its prefix, a defined assignment of the prefixes through the association logic is not necessary. The switching thresholds of the particular comparators are spaced apart far enough so sufficient time differential for processing the subsequent status changes through the time measurement unit (double impulse resolution) is provided. The time measurement unit has a double impulse resolution of less than 10 ns. In the embodiment of the circuit with one comparator, the time measurement unit processes two status changes of the comparator signal (35)—in an embodiment with a number of two to N comparators two times N status changes are being processed.

Since all status changes of the comparator signal are arranged symmetrical in pairs to the position signal mean value, for its computation, the summation of all measurement values suffices as the simplest possible mathematical operation. No multiplication or division is necessary. This means minor computation effort and differentiates the method from a processing based on interpolation or balanced computations of groups of value sets, which are not arranged in pairs symmetrical to the middle, in an advantageous manner.

The comparator signal (35) is supplied to the input of the time measurement unit (21). The time measurement unit is provided as a typical time digital converter (TDC) as an integrated circuit. The time resolution of the time digital converter is approximately 100 picoseconds. The time measurement is multi-hit capable, this means that it can capture several status changes occurring after a start impulse (36), also in short time sequence, and store the result of the time measurement in an internal memory. The time measurement at the beginning of the measurement is started by a starting impulse (36) supplied by the processing and arithmetic unit (20), and captures the subsequently incoming status changes of the comparator signal (35). Thereby, the rising and also the descending flanks of the comparator signal are processed as timed events and a respective measurement value is stored in between. A measurement cycle of the time measurement unit thus captures several measurement values, all of which are associated with a single position impulse. A time measurement unit of a preferred embodiment comprises four measurement values per position impulse with two comparators. An alternative embodiment provides for the capture of four measurement values with only one comparator for a two magnet array so that a set of two incoming measurement values is used for mean value computation for each of the two position impulses.

Corresponding to a preferred embodiment, two measurement values are captured per position impulse. These are put out by the multi-tasking and arithmetic unit (20) within 10 microseconds after the capture for further processing. In an array with several magnets, the time measurement unit for processing further position impulses is started again, and a coarse time value is stored by the multitasking and arithmetic unit for processing. In a preferred embodiment, the time measurement unit already takes over the addition of the measurement values associated with a position impulse in a measurement value accumulator. In a further alternative embodiment, the time measurement unit has more than one measurement channel and captures in each measurement channel a subset of the measurement values associated with a position impulse.

An alternative embodiment allows a time difference measurement between a first analog position impulse and one or several time wise subsequent position impulses. The measurement beginning is not defined through a digital starting impulse but through a first and analog position impulse. A number of position impulses, as described above, is formed for the first analog position impulse and for the subsequent position impulses. The value set for all position impulses is stored in the time measurement unit and is further processed after the completion of the measurement cycle. Thereby, the allocation of the measurement value subsets to the analog position impulses is performed by the processing unit. Alternatively, the measurement value subset belonging to each single position impulse is immediately transferred from the time measurement unit to the control unit. The measurement value capture through the time measurement unit thereby can—after putting out measurement value subsets—be started new between the single impulses or can be operated over all analog impulses continuously when storing the entire measurement value set. This depends on the design of the time measurement unit and the number of memories provided.

The time measurement unit receives a reference-timing signal (27) of approximately 2-8 MHz from the processing and arithmetic unit (20). In an alternative embodiment for generating the timing clock, a ceramic resonator (28) is directly connected to the time measurement unit. Furthermore, the time measurement unit includes a temperature measurement circuit to which a thermocouple (29a) and a capacitor (29b) are connected. Since the temperature measurement provided as a resistor-capacitor charging circuit is transferred into a time measurement, the temperature value is also captured via the time measurement unit without the additional effort of the active temperature sensor.

The time measurement unit (21) is connected via a fast serial interface with a bit rate of 25 MHz to the multitasking—and arithmetic unit (20). A measurement result with a resolution of 24 bits thereby can be transferred from the measurement unit into the processing and arithmetic unit in less than 2.4 microseconds. With a timing signal and the transmission of a command code, the activation of the transmission is performed. One, or preferably two, serial data lines provide the transfer of serial data. A synch connection formats the completed transmission with an impulse. The pin-count (number of pins per housing) of sensor data capture systems according to the state of the art with a parallel bus system, with a number of 100, is 3 times higher than at the time measurement unit according to the invention with a serial data bus. Assuming the same pin roster, a surface advantage of 5×5 mm versus 12.5×12.5 mm placement surface is created corresponding to the 6 fold—a substantial contribution to create smaller sensor dimensions.

The multi-tasking and arithmetic unit has the following single features: Interrupt ability for time-and event interrupts, coarse time capture, stand by mode, program memory, data memory, EEPROM-memory for non volatile programmable data, fast arithmetic unit, surveillance unit (Watch-Dog) for dead loops. The data and program memories are registered in 8, 16, or 32 bit data words.

Figure 9:
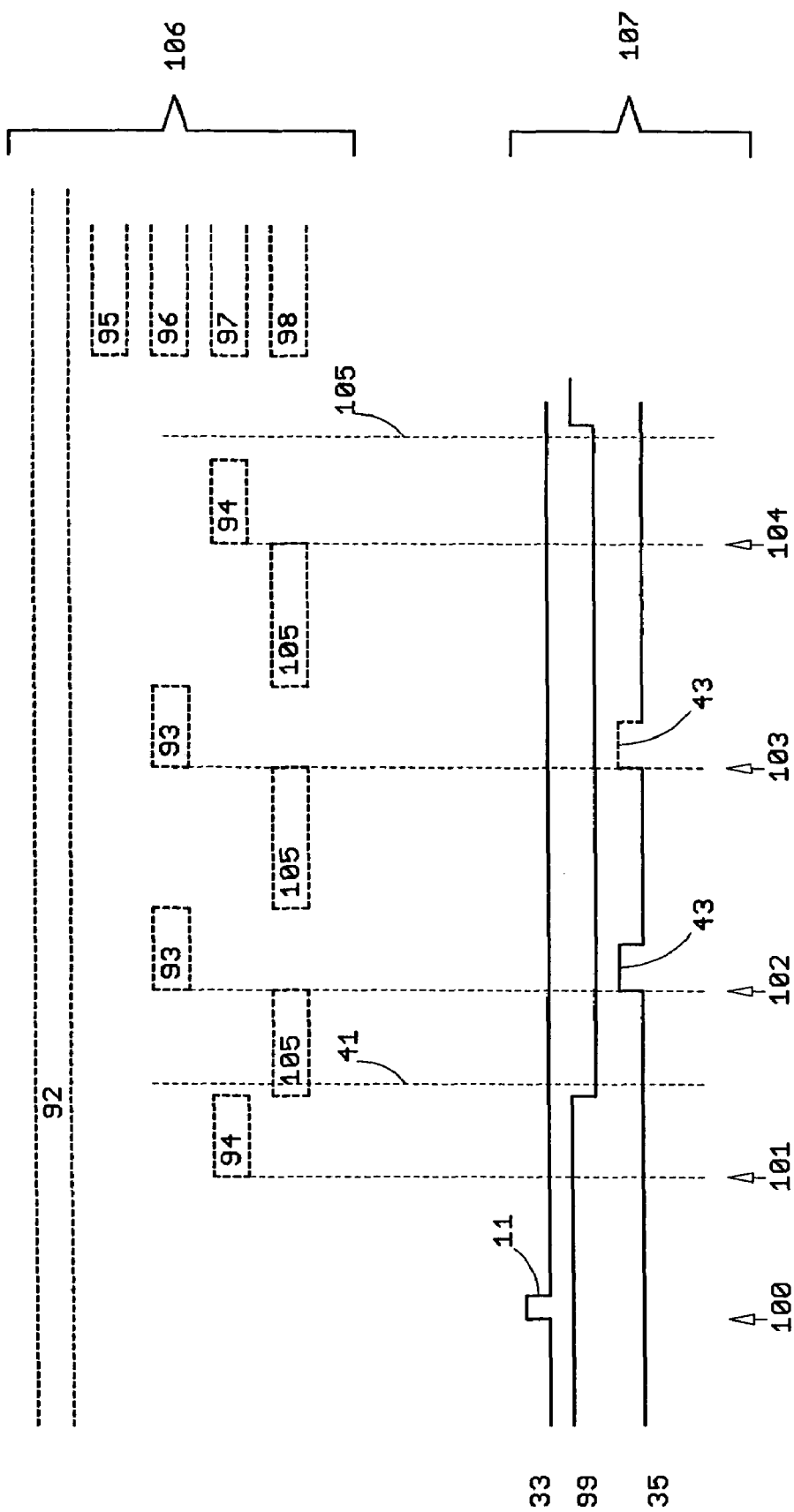
FIG. 9 illustrates a time diagram of the time measuring process and the activity of the control and arithmetic unit.

During the course of a measurement cycle according to FIGS. 9 and 10, the multi-tasking and arithmetic unit performs a sequence of processing steps which are interrupted in case of an error by the processing of error analysis and removal strategies:

Adjustment of the excitation voltage (32) through controlling the elevator (30) via a timing and a feed back connection Generation of an excitation impulse (11) with the switch (25)

Process time interrupt, 'beginning of measuring section'( )

Start time measuring unit (21) through a start impulse (36) on line (34)

Activate stand by mode (105)

Process event interrupt 'position impulse-1' (93)

Activate stand by mode

Process event interrupt 'position impulse-2' (93)

Activate stand by mode

Process time-interrupt 'end of measurement section' (94)

In the event interrupt sequence (93) the following task is being processed:

Read measurement value from time measurement unit

Restart time measurement unit and capture current coarse time value

Count number of magnets

In the time interrupt sequence (94) the following tasks are being processed:

Recognize measurement section beginning and measurement section end

Recognize error condition "no magnet" through time-out

Perform other timing processes like end parameter mode, watch dog surveillance

Equidistant output of measurement values to the subsequent electronics

In peripheral tasks, processed in time-sharing mode (95, 96, 97, 98), additional tasks are being processed. Thereby, the variable break times depending on the position of the magnet located between event-interrupts are being used. In case no processes have to be performed, the multi-tasking and arithmetic unit is put into a power saving stand by mode, which is ended without delay upon the occurrence of an interrupt. Examples for peripheral tasks are:

- Computation of the measurement value sums and determination of the position value (97)
- Measurement of the temperature of the ceramic resonator and correction calculation of the position values
- Adjustment of the switching threshold of the comparator through the impulse width control (96)
- Adjustment of the excitation voltage to a predetermined value (95)
- Perform communication via parameter interface (98)

After time measurement values for each change of state of an impulse sequence of the status signal (61) is captured by the time measurement unit and transferred into the multi-tasking and arithmetic unit, its arithmetic processing is being performed. A position impulse mean is formed through the addition of two measurement values for the time intervals (47) and (49). In an alternative embodiment, the averaging is performed through addition and subsequent division by two. In another alternative embodiment, the determined position values are linearized through computation with a correction value table in order to compensate for tolerances of the wave velocity of the wave conductor. The value table is stored in the non-volatile memory during final testing. In order to perform the linearization depending on the measured position value one or several of the correction values are accessed.

Based on the flexible programming, the multi-tasking and arithmetic unit can not only make simple decisions, like 'magnet is missing.' In a preferred embodiment, the multi-tasking and arithmetic unit reacts to error modes and special operational modes with an error strategy. In case e.g. the position signal is missing, initially no erroneous measurement value is generated and put out, but the detection area is searched through additional measurement cycles with different excitation voltage or different switching threshold.

In addition, it is being examined if other events of the serially incoming time measurements are likely to be correct. This is done through comparison with the latest measurement values processed as being correct, which are stored in an intermediary memory for this purpose.

If it is determined that a non-resolvable error has been occurred, a differentiated error message regarding the exact cause of the error is transmitted to the subsequent electronics, or a status indication provided as a LED is activated.

After each turning on of the supply voltage, the multi-tasking and arithmetic unit performs a self test of the complete sensor. For this purpose, the measurement value capture cycle is interrupted and measurement values like supply voltage, temperature, current position impulse width, and stored measurement length are being captured. Also, program the memories and the non-volatile data memories are being tested for consistency (check sum) and a test of the volatile data memory SRAM is performed.

The multi-tasking and arithmetic unit takes over further tasks serving the improvement and cost reduction within the manufacturing process or after delivery. During final testing after manufacturing, the multi-tasking and arithmetic unit is connected, via an additional communication connection provided as a parameterization interface, to a testing and surveillance unit. Via this interface adjustments like measuring distance, out put voltage, zero point, end point, configuration of available output channels are transferred into the sensor for non-volatile storage. Also, after delivering the product the parameterization interface is usable in order to adapt a zero point adjustment to an installation situation or to perform a functional test. For this purpose, the measurement value capture cycle is interrupted and special program functions are being performed.

A ceramic resonator (26) is the component determining the frequency for the processing and arithmetic unit. In order to achieve a high computation and processing power, a system timing frequency of 20 MHz is provided. The processing and arithmetic unit divides this high frequency system timing down to a reference timing frequency (27) of 2-8 MHz and provides it to the time measurement unit. This has the advantage that the typical period non-symmetries of the system timing oscillator are eliminated through subdivision. Compared to a quartz, the trim precision of a ceramic resonator at 0.5% is 100 times lower and the temperature coefficient at 50 . . . 100 ppm per degree centigrade is two times higher. Thereby, a ceramic resonator, in spite of a substantial cost—and shape advantage, can not be used in a simple manner. A quartz is approximately 10 times more expensive and requires a 5-10 times higher placement surface.

In the layout according to the invention, the trim tolerance of the ceramic resonator is included into the final balancing of the magnetostrictive position sensor. In the final balancing, inevitable manufacturing tolerances like travel the time of the sound of the mechanic elastic wave and mechanical manufacturing tolerances are referenced to a highly precise longitudinal frequency like e.g. a laser-interferometer. A first balancing factor is stored after the final measurement in the processing and arithmetic unit. Another second balancing factor is stored for compensation of the temperature influence of the ceramic resonator. During normal operation, the current temperature of the ceramic resonator is measured by the time measurement unit and both compensation factors are computed with the measured time values in order to obtain a corrected and temperature stable position value. In order to receive a temperature information from the ceramic resonator that has as little error as possible, the measurement resistor (29) connected to the time measurement unit is located in the printed circuit board lay out of the electronics group directly next to the ceramic resonator (26) or (28) in the alternative embodiment. Due to the high computing power of the processing and arithmetic unit, the computation of the balancing factors for the correction computation requires minor effort so that the cost advantage and the shape advantage are more important.

The layout according to the invention is provided on a single printed circuit board (15), this allows using the reduced placement surface requirement novel housing designs as a flat profile with 35 mm width times 12 mm height or as a round profile with 25 mm diameter. With a state of the art design concept this is not possible. For the housing variants according to the invention with the housing profile and the closing caps, the relevant custom manufactured parts are defined and all other elements are provided as standard parts like round seals, bolts, connectors, etc.

REFERENCE NUMERALS

1 Magnetostrictive position sensor
2 Wave conductor detector unit
3 Position magnet
4 Wave conductor
5 Detector end of wave conductor
6 Foot point end of wave conductor
7 Detector for mechanic elastic impulse wave
8 Connection conductor pair for excitation circuit
9 Connection conductor pair for detector coil
10 Mechanic elastic impulse wave 11 Excitation electrical impulse in excitation circuit
12 Housing of magnetostrictive position sensor
13 Closing cap
14 Seals
15 Electronics group
16 Holder for electronics group
17 Connector=output line
18 Multi tasking—and arithmetic unit=processing unit
19 Connector for interior wiring
20 Multitasking—and arithmetic unit=control unit (microcontroller)
21 Time measuring unit
22 Association logic=association unit
23 Comparator unit
24 Preamplifier
25 Switch for excitation circuit
26 Ceramic resonator for multi tasking and arithmetic unit
27 Reference timing signal
28 Ceramic resonator for time measurement unit
29a Thermocouple
29b Capacitor
30 Elevator unit
31 Symmetry axis of position impulse
32 Excitation voltage
33 Excitation signal for excitation circuit
34 Starting signal for time measurement unit
35 Comparator signal
36 First start impulse for time measurement unit
37 Second start impulse for time measurement unit
38 Interrupt signal
39 Switching threshold
40 Amplitude peak value of analog position impulse
41 Beginning of first time measurement interval
42 Rising flank of comparator status signal
43 First digital position impulse
44 Descending flank of comparator status signal
45 Beginning of second time measurement interval
46 Second digital position impulse
47 First uncompromised time interval
47a, 47b First time interval compromised by amplitude error
47c First time interval compromised by offset error
48 Second uncompromised time interval
48a, 48b Second time interval compromised by amplitude error
48c Second time interval compromised by off set error
49 Position impulse middle value
50 position impulse width
51 Difference time span for second start impulse
55 First switching threshold
56 Second switching threshold
57 Third switching threshold
58 First digital comparator signal
59 Second digital comparator signal
60 Third digital comparator signal
61 - - -
62-67 Time measurement intervals for the status changes of the comparator status signal
68 Position impulse middle value
69 First position impulse
70 Second position impulse
71 Third position impulse
72 Impulse width of second position impulse
73 Impulse sequence of comparator status signal
74 Analog position signal
75 Output signal of DA converter
76 DA converter
77 Interface, multi polar, for controlling DA converter with digital values
78,79 Voltage divider for first comparator threshold
80,81 Voltage divider for second comparator threshold
84 First comparator
85 Second comparator
86 Third comparator
87,88 EXCLUSIVE-OR logic grid
89,90 Voltage divider for switching threshold
91 Comparator
92 Task switcher
93 Event interrupt service routine
94 Timer interrupt service routine
95 Task: elevator
96 Task: impulse width control
98 Task: Interface output
98 Task: communication service channel
99 Detector enable hardware signal
100 Action: Generate excitation impulse
101 Event: timing generator interrupt
102 Event: position impulse interrupt
103 Event: position impulse interrupt
104 Event: timing generator interrupt
105 Task: stand by phase
106 Tasks
107 Activities and events

The invention claimed is
1. A process for determining a time interval between a start impulse (34) and a position impulse of a position sensor (1) according to a travel time principle wherein said start impulse is generated by the position sensor and the position impulse is generated by a position magnet as response to the start impulse depending on the position of the position magnet, said process comprising:
emitting of said start impulse:
receiving an analog position impulse as a response to the start impulse in dependency of the position of the position magnet;
generating at least one digital position impulse (69) with defined time width from the analog position impulse (74) such that a middle (69') of the position impulse of the digital position impulse (69) is located at a middle (68) of the position impulse of the analog position impulse (74); and
determining said time interval (67) as time difference between the starting impulse (34) and the position impulse middle value (69') of the digital position impulse (69).
2. A process according to claim 1 wherein from the analog position impulse (74) several digital impulses (69, 70. . . ) with different time width are generated, and
the time interval (67) is determined as a time difference between the start impulse (34) and the averaged middle values (69', 70'. . .) of all generated digital position impulses (69,70).
3. A process according to claim 2 wherein said at least one digital position impulse is generated from said analog position impulse through at least one comparator.
4. A process according to claim 3 wherein said at least one comparator for generating the different digital position impulses (69, 70, . . . ) switches at different switching thresholds (55, 56, . . . ).
5. A process according to claim 4 wherein the switching threshold of said at least one comparator is set to a value of 50% to 80% of an expected peak amplitude value (40) of the analog position impulse (74).

6. A process according to claim 4 wherein the switching thresholds (55, 56) of the particular comparators (84, 85, . . . ) are controlled by a control system in a manner so that for the digital position impulses (69, 70, . . . ) a pre determined width is accomplished.

7. The process according to claim 6 wherein the switching thresholds (55, 56) of the comparators (84, 85, . . . ) considering their impulse widths are controlled by a processing unit so that the impulse widths are maintained at a constant value.

8. The process according to claim 4 wherein the switching thresholds (55,56) of the comparators (94,95, . . . ) are controlled by a control system so that the time difference between two subsequent flanks of the various digital position impulses (69,70, . . . ) have at least a time difference of 10 nanoseconds.

9. The process according to claim 4 wherein three digital position impulses are generated from said analog position impulse through a first, a second and a third comparator being connected in parallel wherein the switching thresholds of the first, the second and the third comparator are set to 60%, 70%, and 80% of an expected peak amplitude value.

10. The process according to claim 4 wherein the switching thresholds (55,56) of the particular comparators (84, 85, . . . ) are controlled by a control system in a manner so that for the digital position impulses (69, 70, . . . ) predetermined ratios of the width of the digital position impulses or the reference signals relative to each other are accomplished.

11. The process according to claim 4 wherein the switching thresholds (55, 56) of the particular comparators (84, 85, . . . ) are controlled by a control system in a manner so that for the digital position impulses (69, 70, . . . ) predetermined ratios of the width of the digital position impulses and the reference signals relative to each other are accomplished.

12. A process according to claim 1 wherein a width of said at least one digital position impulses, is generated by subtracting a second time period from a first time period.

13. A process according claim 1 wherein several digital position impulses are combined into a digital reference signal wherein a middle value (73') of the time width of the reference signal corresponds to the averaged digital middle values (69', 70', . . . ) of all generated digital position impulses (69, 70, . . . ).

14. A process according to claim 1 wherein a reference signal changes its switching status with each status change of one of the digital position impulses (69,70, . . . ).

15. A process according to claim 1 wherein particular time intervals (62, 63 . . . ) are determined between said start impulse (34) and each status change, in form of rising flanks (e.g. 69a) and falling flanks (69b).

16. A process according to claim 1 wherein a time measurement unit generates at least in one measurement channel measurement values for all time intervals between the measurement beginning and each status change of one of the digital reference signals, and two or several reference signals are subsequently combined with each other.

17. The process according to claim 1 wherein width of the digital position impulse is compared to a predetermined value and an error flag is set when surpassing a predefined maximum deviation.

18. The process according to claim 1 wherein a time measurement unit has a measuring channel and performs two or more subsequent time measurements for each status change of a digital comparator signal and stores the measurements in an intermediary memory.

19. The process according to claim 1 wherein a ceramic resonator is used as a time generator.

20. The process according to claim 19 wherein temperature of said ceramic resonator itself or on a printed circuit board close to the ceramic resonator is measured and timing signals generated by the ceramic resonator are corrected by a temperature factor, depending on the measured temperature and thereby the ceramic resonator temperature is standardized.

21. The process according to claim 20 wherein a temperature sensor is a thermocouple and a conversion factor is adapted depending on the temperature of the ceramic resonator.

22. The process according to claim 19 wherein a trim tolerance of the ceramic resonator is corrected through comparison with a geometric measurement value.

23. The process according to claim 19 wherein a starting impulse (34) is emitted at the earliest after an initial waiting time after activating the ceramic resonator and a processing unit of at least 10 µs.

24. The process according to claim 1 wherein after determining the time interval (67) another time interval (67') corresponding to a position of another magnet is determined according to the process according to claim 1, wherein between the two measurement cycles a cycle waiting time of less than 20 µs has to be maintained.

25. The process according to claim 1 wherein the digital middle values (69', 70' . . . .) or the individual time intervals which had been determined (62, 63, . . . ) are added to obtain a sum and said sum is set as time interval (67) between the start impulse (74) and the position impulse.

26. The process according to claim 1 wherein the digital middle values (69', 70' . . . ) or the individual time intervals which had been determined (62, 63, . . . ) are added to obtain a sum, an average value is determined by dividing the sum by the number of its summands and the average value is set as time interval (67) between the start impulse (74) and the position impulse.

27. A device for determining a time interval between a starting impulse (34) and a position impulse of a position sensor (1) according to a travel time principles wherein said start impulse is generated by the position sensor and the position impulse is generated by a position magnet as response to the start impulse depending on the position of the magnet, said device comprising:

a ceramic resonator (28, 26) provided as a time generator as a basis for measuring time intervals.

28. The device according to claim 27 further including a time measurement unit (21) and a control unit, connected with a serial interface which can transmit in less than 3 µ is from the time measurement unit (21) into the control unit (20) with a resolution of at least 24 bit and a bit rate of at least 10 MBaud, better 20 MBaud.

29. The device according to claim 28 wherein between the time measurement unit (21) and the control unit (20) one or two serial data lines provide transfer of serial data.

30. The device according to claim 28 including a second ceramic resonator provided as a time generator so that the time measurement unit (21), and the control unit (20) each includes a time generator in the form of a ceramic resonator.

31. A device according to claim 28 wherein the control unit (20) can be programmed and/or parameterized.

32. The device according to claim 28 wherein the control unit (20) includes a stand by mode for saving power.

33. The device according to claim 28 wherein flank sensitivity of the time measurement unit can be freely configured and can be adjusted for processing rising and falling signal flanks.

34. The device according to claim 28 wherein the time measurement unit can be configured for temperature measurement, whereby the temperature of the ceramic resonator can be determined.

35. The device according to claim 27 further including an electronics group (15) having only one connection pair (8) for the start impulse, one connection pair (9) for a detector (7) and one output line (17) for putting out a measurement result, and possibly one auxiliary energy connection.

36. The device according to claim 35 wherein said output line (17) is
a one- or multi channel analog output, a bus interface or a SSI interface with conductors for the timing signal and the data signals.

37. The device according to claim 27 further including an electronics group (15) having,
a comparator unit (23) for comparing the analog position impulses (74) with the switching thresholds (55, 56),
an association unit (22) for associating the status changes of the digital position impulses (69, 70),
a time measurement unit (21) for measuring the time intervals (62, 63, . . . ),
a control unit (20) for controlling all operations of the measuring cycle and performing computation steps.

38. The device according to claim 37 wherein the comparator unit (23) comprises one or several comparators, voltage comparators.

39. The device according to claim 37 wherein the association unit (22) comprises one or several EX-OR grids, a tree structure.

40. The device according to claim 37 wherein the association unit comprises a parameter interface for adjustment and/or testing of non-volatile parameters.

41. The device according to claim 27 further including an electronics group (15) having,
a preamplifier (24) for the analog position impulse (74),
a switch (25) for the start impulse,
an elevator unit (30) for the control unit (20) and/or,
a D/A-converter (76) between the control unit (20) and the comparator unit (23).

42. The device according to claim 41 wherein the D/A converter (76) has a resolution of 4-12 bit for controlling shifting thresholds (55, 56, . . . ).

43. The device according to claim 27 further including an electronics group (15) having, within or at the ceramic resonator (28) of the time measurement unit (21) and/or at the ceramic resonator (26) of a control unit (20), a temperature sensor.

* * * * *

UNITED STATES PATENT AND TRADEMARK OFFICE
CERTIFICATE OF CORRECTION

PATENT NO.      : 7,619,405 B2                                          Page 1 of 1
APPLICATION NO. : 11/583611
DATED           : November 17, 2009
INVENTOR(S)     : Steinich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 433 days.

Signed and Sealed this

Twenty-sixth Day of October, 2010

David J. Kappos
*Director of the United States Patent and Trademark Office*